R. DANIELS.
Straw Cutter.
No. 7,472. Patented July 2, 1850.
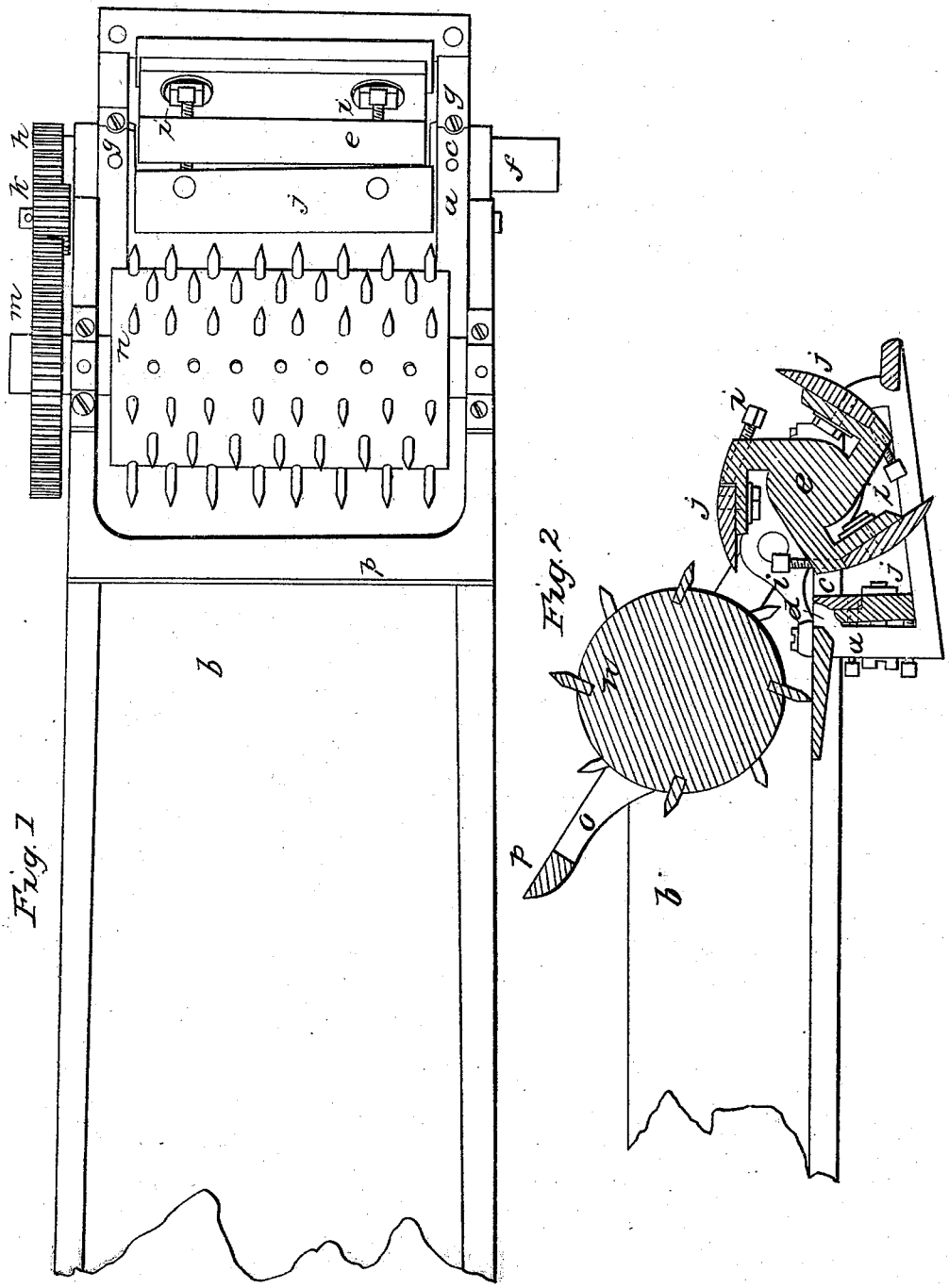

UNITED STATES PATENT OFFICE.

REUBEN DANIELS, OF WOODSTOCK, VERMONT.

STRAW-CUTTER.

Specification of Letters Patent No. 7,472, dated July 2, 1850.

*To all whom it may concern:*

Be it known that I, REUBEN DANIELS, of Woodstock, in the county of Windsor and State of Vermont, have invented a new and useful Improvement in the Machine for Cutting Straw, Fodder, and other Like Substances, and that the following is a full, clear, and exact description of the principle or character which distinguishes it from all other things before known and of the manner of making, constructing, and using the same, reference being had to the accompanying drawings, making part of this specification, in which—

Figure 1 is a plan, and Fig. 2 a longitudinal vertical section of the machine.

The same letters indicate like parts in all the figures.

In my improved machine, the straw, or other substance to be cut, is fed forward continuously on a bed, by the rotation of a roller with pointed pins projecting from its periphery, which said roller has its bearings in a swinging frame, borne down by weighted levers, and rotates by a pinion on the axis of vibration, and which engages the cogs of a wheel on the roller and one on the arbor of the cutting cylinder. And as the straw, etc., is pushed forward over the smooth bed and permanent cutter at the end thereof, it is severed into pieces, of the length required by a series of knives, two, three, or more, so attached to a rotating stock, that the cutting edges, in their rotation, generate a cylinder, and their outer faces are eccentric, that is, from the cutting edge, back, they gradually approach the axis, that the feed may not be arrested.

What constitutes the principle, or character, of my invention, which distinguishes it from all other things before known, is the method of feeding, or moving, the straw, or other substance to be cut, toward the cutters, on the bed, and over the permanent cutter, or shear, by the continuous rotation of a roller having pointed teeth, when the said roller is hung in a swinging frame, to make pressure on to the substance to be cut, when this is combined with the eccentric form of the outer face of the cutter, to permit the feed to be continuous, while the cutting is intermittent.

In the accompanying drawings ($a$) represents the frame, which is in the form generally adopted for straw cutters, with a feed box ($b$) in which the straw, or other substance, is put. The forward end of the bed of this box, at ($c$,) is made of iron, and flat, and is provided with a permanent shear cutter ($d$) with a straight edge projecting with a slight inclination from the bed. In front of this permanent cutter is hung the cutting cylinder, ($e$,) the shaft ($f$) of which turns in appropriate boxes ($g\ g$) and is provided at one end with a crank handle or pulley, by which it is rotated, and at the other end with a cog wheel ($h$). The stock of this cutting cylinder is formed with three (more or less) flanches, to each of which is properly secured by screw bolts ($i$) a cutter ($j$) with a straight cutting edge placed a little obliquely to the line of the axis, so as to cut gradually from one end to the other. They are so set, as just to touch the permanent shear in their rotation, to insure a clean cut, and may be accurately set by means of the screw bolts, which for this purpose pass through elongated holes, in manner well known to all mechanics. The outer face, or surface, of the cutters is eccentric, that is, from the cutting edge they gradually approach the axis to such an extent, that, if this line were continued from one cutter to the next, it would approach the axis to an extent at least equal to the greatest length of feed intended to be given for each cut.

The cog wheel ($h$) on the shaft of the cutting cylinder engages the cogs of a pinion, ($k$,) that turns on a stud pin, ($l$,) and this in turn engages the cogs of another pinion ($m$) on the arbor of a roller ($n$) that has its bearings in a frame ($o$) that vibrates on centers corresponding with the axes of the pinion ($k$) so that, however this frame may vibrate, the cogs of the two pinions will always be engaged. The roller ($n$) is made of wood; and its periphery is armed with rows of pointed teeth, inclined from the line of the radii, and the frame, in which this roller is hung, is provided with a weighted lever, ($p$) for the purpose of pressing the roller down, that its teeth may enter and take hold of the straw, or other substance to be cut, and by its rotation feed or move it forward with a continuous motion to the cutters,—the inclination of the teeth preventing them from lifting up the straw, as they leave it; for if they were radial, they would have the tendency to lift and carry up the straw, etc.

The advantages of this improved machine, over all others heretofore made, consist in avoiding these difficulties,—that when the feeding is effected by passing the straw between two rollers, the bed of the feed box must of necessity be cut out for the bottom roller, and the roller have constantly a tendency to carry over the straw, etc., which soon fills up the place around the bottom roller and clogs the operation of the machine; and as the upper roller must vibrate, what is called star gearing, which is known to be defective, must be used;—and besides, the substance can only be fed and carried forward by pressing it between the two rollers,—an effect, which, for many purposes, is objectionable. And finally, when rotating cutters placed in front of the feed box, have been used, the feeding has been intermittent, requiring ratchet wheels and hands, which soon get out of order.

What I claim as my invention, and desire to secure by Letters Patent, is—

1. The method of feeding straw, fodder, and other substances, to a series of rotating cutters by means of a continuous motion by a roller armed with pointed teeth and hung in a swinging frame, substantially as described.

2. I also claim the method of cutting straw, fodder, and other like substances, by means of the cutting cylinder, provided with cutters, the outer faces of which, from the cutting edge, are curved or inclined in toward the axes so as to admit of continuous feed, the blades of the cutters acting as gage plates for the length of the cut in combination with the feeding the straw, fodder or other substance to be cut, by a continuous motion substantially as set forth.

REUBEN DANIELS.

Witnesses:
NATHUM HASKELL,
THOS. RUSSELL.